(12) United States Patent
Svajda et al.

(10) Patent No.: US 8,723,149 B2
(45) Date of Patent: May 13, 2014

(54) SYSTEMS AND METHODS FOR ADVANCED MONITORING AND CONTROL USING AN LED DRIVER IN AN OPTICAL PROCESSOR

(75) Inventors: Miroslav Svajda, San Jose, CA (US); Wayne T. Holcombe, Mountain View, CA (US)

(73) Assignee: Silicon Laboratories Inc., Austin, TX (US)

( * ) Notice: Subject to any disclaimer, the term of this patent is extended or adjusted under 35 U.S.C. 154(b) by 626 days.

(21) Appl. No.: 12/943,263

(22) Filed: Nov. 10, 2010

(65) Prior Publication Data

US 2011/0248194 A1 Oct. 13, 2011

Related U.S. Application Data

(60) Provisional application No. 61/323,798, filed on Apr. 13, 2010.

(51) Int. Cl.
*H01L 31/14* (2006.01)
(52) U.S. Cl.
USPC ............... 250/552; 250/559.28; 250/559.29; 356/3.11; 356/3.12
(58) Field of Classification Search
USPC ............... 250/552, 559.29, 559.28; 356/3.11, 356/3.12
See application file for complete search history.

(56) References Cited

U.S. PATENT DOCUMENTS 6,356,774 B1 * 3/2002 Bernstein et al. ............. 600/323
8,242,476 B2 * 8/2012 Mimeault et al. ......... 250/559.29
2005/0264523 A1 * 12/2005 Yoshida et al. ............... 345/156
2007/0262920 A1 * 11/2007 Werner et al. .................... 345/46
2008/0074380 A1 * 3/2008 Owyeung et al. ............. 345/102
2009/0171174 A1 * 7/2009 Kilborn .......................... 600/324
2011/0019205 A1 * 1/2011 Gerber et al. ................. 356/615

FOREIGN PATENT DOCUMENTS

WO WO 2010015409 A1 * 2/2010

OTHER PUBLICATIONS

U.S. Appl. No. 12/913,080, entitled "Systems and Methods for Handling Data Rate Changes Within a Packet or Frame", filed Oct. 27, 2010.
U.S. Appl. No. 12/975,819, entitled "Systems and Methods for a Digital-to-Charge Converter (DQC)", filed Dec. 22, 2010.
U.S. Appl. No. 12/650,738, entitled "High-Voltage Constant Current LED Driver for Optical Provessor," filed Dec. 31, 2009.
U.S. Appl. No. 61/323,798, filed Apr. 14, 2010.

* cited by examiner

*Primary Examiner* — Seung C Sohn
*Assistant Examiner* — Kevin Wyatt
(74) *Attorney, Agent, or Firm* — Meyertons, Hood, Kivlin, Kowert & Goetzel, P.C.

(57) ABSTRACT

Systems and methods for advanced monitoring and control using an LED driver in an optical processor are described. In an embodiment, a monitoring and control circuit may include a light-emitting diode (LED) driver including a control input, an output, and a node, wherein the output is coupled to an LED. The circuit may also include a multiplexer coupled to the node of the LED driver, an analog-to-digital converter coupled to the multiplexer, and a controller coupled to the analog-to-digital converter and to the control input of the LED driver, wherein the LED driver is coupled to drive the output with a first voltage supply that is independent from a second voltage supply that is coupled to drive the controller.

20 Claims, 10 Drawing Sheets

SYSTEMS AND METHODS FOR ADVANCED MONITORING AND CONTROL USING AN LED DRIVER IN AN OPTICAL PROCESSOR

CROSS REFERENCE TO RELATED APPLICATIONS

This disclosure is related and claims priority to U.S. Patent Provisional Application No. 61/323,798, entitled "APPARATUS WITH OPTICAL FUNCTIONALITY AND ASSOCIATED METHODS" filed on Apr. 13, 2010, which is hereby incorporated by reference in its entirety.

BACKGROUND

1. Field of the Invention

This disclosure relates to optical sensors, and, more particularly, to systems and methods for advanced monitoring and control in an optical processor using an LED driver.

2. Description of the Related Art

An optical sensor is a device capable of converting light—visible or otherwise—into electrical signals. Optical sensors may be employed in various applications, including, for example, ambient light sensing, touchless human interfaces, etc.

A typical optical sensor may include at least one photodetector for receiving a light signal. In some applications, it may also include a light emitting diode (LED) for emitting a light signal. In certain modes of operation, an optical sensor may emit a signal using its LED, measure a reflection of the emitted signal with its photodiode, and then compare the emitted and received signals. For example, the comparison may be based on a difference of intensity, time, and/or phase between the signals. Depending on its configuration, the optical sensor IC may then be able to determine the identity of an object located near the sensor, its distance from the sensor, its direction of movement with respect to the sensor, etc.

SUMMARY

Systems and methods for advanced monitoring and control using an LED driver in an optical processor are described. In an embodiment, a monitoring and control circuit may include a light-emitting diode (LED) driver including a control input, an output, and a node, wherein the output is coupled to an LED. The circuit may also include a multiplexer coupled to the node of the LED driver, an analog-to-digital converter coupled to the multiplexer, and a controller coupled to the analog-to-digital converter and to the control input of the LED driver. The LED driver is coupled to drive the output with a first voltage supply that is independent from a second voltage supply that is coupled to drive the controller.

An embodiment of an optical sensor system may include a host processor and an optical sensor coupled to the host processor. The optical sensor may include a first driver circuit including an input and an output, wherein the output is coupled to at least one electro-optical transducer. The optical sensor may also include a second driver circuit including an input, an output, and a node. The optical sensor may further include a multiplexer circuit coupled to the node of the second driver circuit, an analog-to-digital converter circuit coupled to the multiplexer circuit, and a controller circuit coupled to the analog-to-digital converter circuit, to the input of the first driver circuit, and to the input of the second driver circuit.

An embodiment of a method may include measuring a voltage at a node of a light-emitting diode (LED) driver of an optical sensor, wherein the LED driver is connected to an LED via an output pin. The method may further include determining a voltage at the output pin based, at least in part, on the measured voltage, and modifying an electrical current level of the LED driver based, at least in part, on the determined voltage.

Another embodiment of a method may include measuring a voltage at a node of a light-emitting diode (LED) driver of an optical sensor, wherein the LED driver is connected to an LED via an output pin. The method may also include determining a voltage at the output pin based, at least in part, on the measured voltage, and calculating a device parameter based, at least in part, on the determined voltage.

While being susceptible to various modifications and alternative forms, specific embodiments discussed in this specification are shown by way of example in the drawings and will herein be described in detail. It should be understood, however, that the drawings and detailed description are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Figure 1:
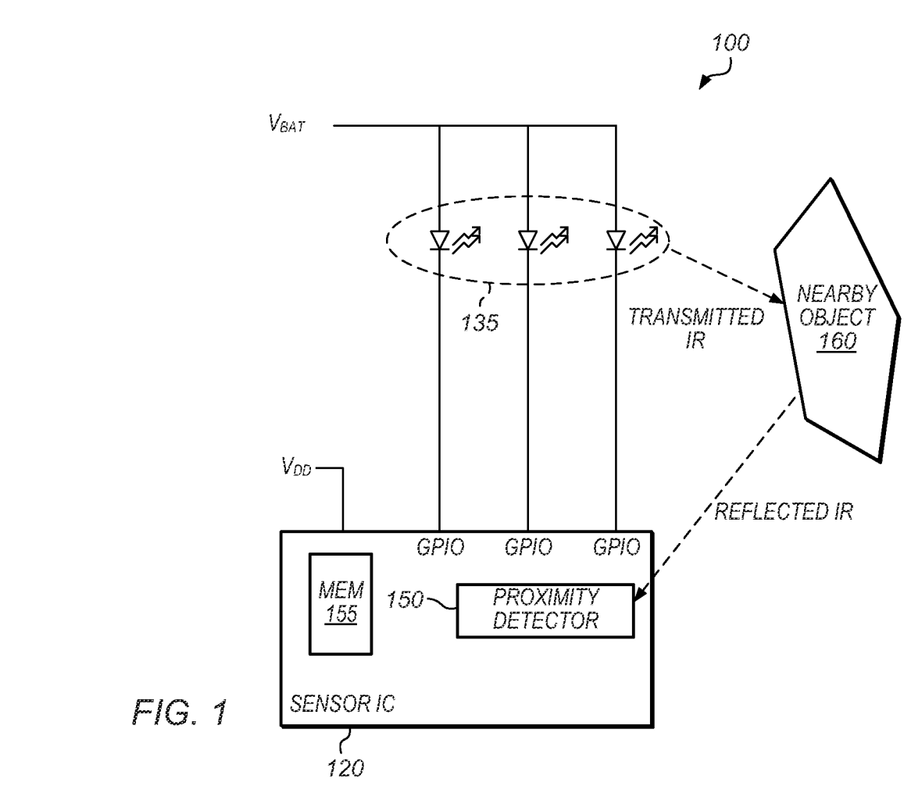
FIG. 1 is a diagram illustrating a system incorporating an optical sensor according to certain embodiments.

FIG. 1 is a diagram illustrating an embodiment of a system incorporating LED drivers that may be configured for advanced monitoring and control applications, as described in greater detail below. In particular, the illustrated system may be configured to perform various types of optical sensing. For example, distance to a nearby object 160 may be estimated by transmitting infrared light from one or more light emitting diodes (LEDs) 135 and measuring the amount of infrared light reflected from object 160.

In the illustrated embodiment, system 100 includes a sensor integrated circuit (IC) 120 coupled to a bank of one or more LEDs 135. As described in greater detail below, IC 120 may include one or more LED drivers configured to operate LEDs 135.

Additionally, in the illustrated embodiment, IC 120 includes a proximity sensor 150 and a memory 155. As discussed in greater detail below with respect to FIGS. 2 and 4, in the embodiment of FIG. 1, the LEDs are driven by a voltage source $V_{BAT}$ that may be independent of the voltage source $V_{DD}$ that drives other system components. For example, $V_{BAT}$ may correspond to a voltage driven directly from a battery or other source, whereas $V_{DD}$ may correspond to a voltage generated by a regulator circuit. In some instances, $V_{DD}$ might be derived from $V_{BAT}$.

In some embodiments, IC 120 may include, and/or may be coupled to, a low-power programmable controller, microcontroller, processor, microprocessor, field-programmable gate array ("FPGA"), or any other suitable control circuit. For example, IC 120 may include or be coupled to one or more of integrated random-access memory ("RAM"), read-only memory ("ROM"), flash memory (or other non-volatile memory generally), one-time programmable ("OTP") circuitry, analog-to-digital converters ("ADCs"), digital-to-analog-converters ("DACs"), counters, timers, input/output ("I/O") circuitry, reference circuitry, clock and timing circuitry (including distribution circuitry), arithmetic circuitry (e.g., adders, subtractors, multipliers, dividers), general and programmable logic circuitry, power regulators, or the like.

System memory 155 within IC 120 represents an embodiment of a computer-accessible or computer-readable storage medium configured to store program instructions and data. In other embodiments, program instructions and/or data may be received, sent or stored upon different types of computer-accessible media. In general, a computer-accessible medium or storage medium may include any type of mass storage media or memory media such as magnetic or optical media. A computer-accessible medium or storage medium may also include any volatile or non-volatile media such as RAM (e.g., SDRAM, DDR SDRAM, RDRAM, SRAM, etc.), ROM, or the like, whether included in IC 120 as system memory 155 or another type of memory, such as a memory coupled to IC 120 or to a processor or controller external to IC 120. Program instructions and data stored via a computer-accessible medium may be transmitted by transmission media or signals such as electrical, electromagnetic, or digital signals, which may be conveyed via a communication medium such as a network and/or a wireless link, such as may be implemented via any interface.

In one mode of operation, system 100 may detect ambient light using one or more photodiodes sensitive to visible light and residing within or coupled to IC 120. This mode of operation may be used, for example, in an application where the brightness of a display (or any other parameter associated with any device connected to system 100) is controlled as a function of detected ambient light. For instance, if there is sufficient ambient light present during operation, then the brightness of the display may be automatically reduced. In a dark environment where detected ambient light is deemed insufficient, the brightness of the display may be increased.

In another mode of operation, one or more of LEDs 135 may be infrared LEDs such that infrared radiation emitted by LEDs 125 is reflected from nearby object 160 and received at proximity detector 150. This mode of operation may be used, for example, to implement a touchless human interface or the like. For instance, if a mobile phone or device employing system 100 is placed near a person's ear (i.e., an instance of a nearby object 160), then proximity detector 150 may provide an indication that the screen should be temporarily turned off. Once the person moves the device away, proximity detector 150 may determine that the screen should be turned back on.

In yet another mode of operation, system 100 may be employed to implement gesture recognition. However, these modes of operation are described for purposes of illustration only. It should be noted that system 100 can be used for numerous purposes in a wide variety of applications. That is, system 100 is not limited to optical sensing, and it is contemplated that the LED driver embodiments discussed below may be employed in any suitable type of system.

Figure 2:
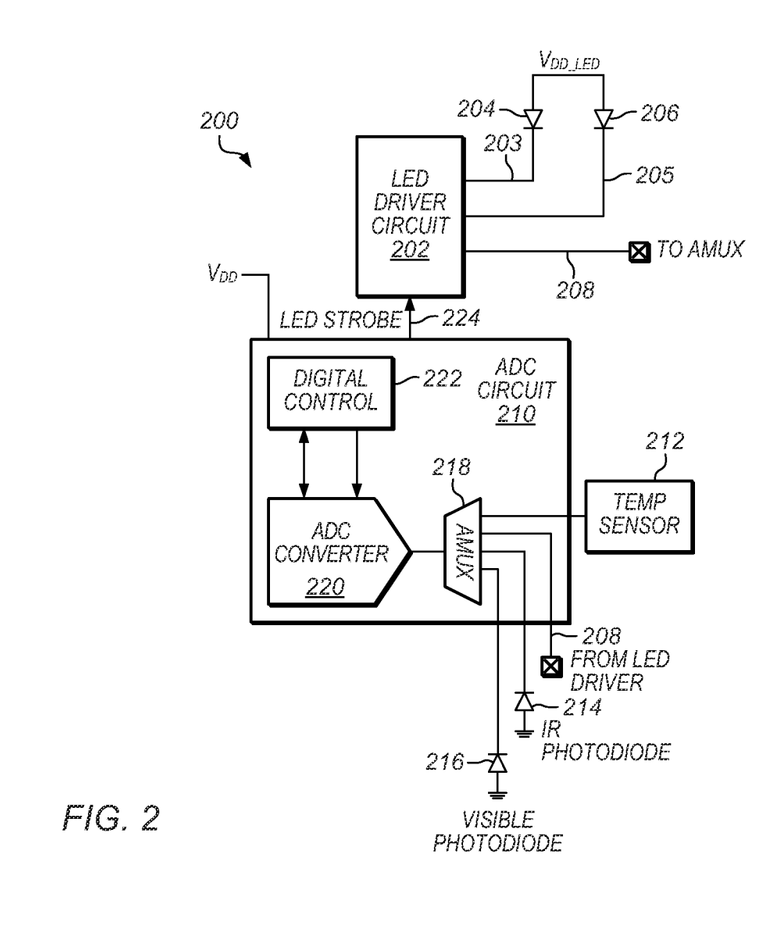
FIG. 2 is a diagram illustrating an monitoring and control circuit configured to implement advanced system monitoring and control using LED drivers according to certain embodiments.

FIG. 2 is a diagram of a monitoring and control circuit 200 configured to implement advanced system monitoring and control using LED drivers according to certain embodiments. In some embodiments, circuit 200 may be similar to those described in U.S. patent application Ser. No. 12/650,738. And in some instances, circuit 200 may be used as or included within optical sensor IC 120 described in FIG. 1. However, as noted above, an optical sensor is merely one illustrative example of a circuit that may perform monitoring and control using LED drivers. The various LED driver circuit embodiments discussed below may be employed in any suitable monitoring and control circuit.

LED driver circuit 202 may be coupled to analog-to-digital converter ("ADC") circuit 210 and may receive an LED strobe signal via line 224 for controlling LED illumination. In some embodiments, LED driver circuit 202 may receive as input one or more control or logic signals to control the mode of the driver and/or its electrical current level. ADC circuit 210 may include digital control circuitry 222 for operating ADC 210. Signals from ADC 210 may be output over digital special function register (SFR) bus 226, although any other suitable bus may be used. An analog input may be provided to ADC 210 from analog multiplexer ("AMUX") 218. AMUX 218 may be controlled by digital control circuitry 222 and may be connected to visible light photodiode 216, infrared ("IR") photodiode 214, temperature sensor 212, and/or one or more outputs of LED driver 202, as discussed below. Visible light photodiode 216 and/or IR photodiode 214 may form an optical sensing circuit.

As shown in FIG. 2, two different voltage supplies may be employed to drive different elements of monitoring and control circuit 200. In the illustrated embodiment, $V_{DD\_LED}$ is coupled to drive LED 206, whereas $V_{DD}$ is coupled to drive other components such as the various elements of ADC 210. As noted above with respect to FIG. 1, $V_{DD\_LED}$ may be configured as a voltage source that is independent of $V_{DD}$. For example, $V_{DD\_LED}$ may correspond to a battery-supplied voltage $V_{BAT}$, whereas $V_{DD}$ may correspond to a regulated supply voltage derived from $V_{BAT}$.

The use of an LED voltage supply that is independent from the $V_{DD}$ supply that drives the control circuitry of LED driver 202 may help reduce the susceptibility of monitoring and control circuit 200 to the pathological circuit phenomenon known as "latch-up." Generally speaking, the potential for latch-up arises as an unwanted consequence of parasitic circuit elements that occur within CMOS devices. For example, the contacts between N-type and P-type regions may create parasitic transistors coupled in a way that creates a parasitic silicon controlled rectifier (SCR). If triggered, this parasitic SCR may create a positive-feedback loop in which a high amount of current flows continuously through the device, typically until the device is depowered. Often, the high currents resulting from latch-up are sufficient to destroy a CMOS device.

The parasitic SCR may be triggered if a supply voltage falls sufficiently below a control input voltage (e.g., a voltage applied to a MOSFET gate as an I/O input), or conversely if the control input voltage rises sufficiently above the supply voltage. These conditions may arise, for example, due to spikes or transients in system operation, such as might arise due to the switching of substantial loads, electrostatic discharge (ESD) events, or improper sequencing of different power supplies (e.g., allowing differently-controlled power supplies to active or deactivate in a sequence that causes the SCR-triggering configuration of voltages to occur).

In the embodiment of monitoring and control circuit 200 shown in FIG. 2, driving the output device(s) (e.g., LEDs 204, 206) that are coupled to LED driver circuit 202 with independent supply $V_{DD\_LED}$ instead of supply $V_{DD}$ may reduce the likelihood that latch-up may occur. In some embodiments, $V_{DD}$ may be derived from $V_{DD\_LED}$, for example through a voltage regulator circuit. In such embodiments, $V_{DD}$ may generally be lower than $V_{DD\_LED}$ (e.g., typically by at least the voltage drop across a diode in the voltage regulator circuit). By driving the output devices coupled to LED driver circuit 202 using the higher $V_{DD\_LED}$ supply, the likelihood of the control input voltage to LED driver 202 exceeding the driver's supply voltage (and possibly triggering latch-up) may be reduced.

Also, if $V_{DD}$ is derived from $V_{DD\_LED}$, the configuration of monitoring and control circuit 200 that is shown in FIG. 2 may exhibit reduced sensitivity to latch-up arising from sequencing issues. For example, if $V_{DD\_LED}$ is driven directly from a higher-voltage source such as a battery, and if $V_{DD}$ is a regulated, lower-voltage version of the higher-voltage source, then under normal power-up circumstances, it may be practically impossible for $V_{DD}$ to develop a higher voltage than $V_{DD\_LED}$. Accordingly, it may be unnecessary to synchronize the activation or deactivation of $V_{DD\_LED}$ with other supplies in order to prevent latch-up. It is noted that in some embodiments, the actual voltage value driven at the output of LED driver 202 at a given time may be any suitable value (including values that may be higher or lower than $V_{DD}$), depending on the characteristics of the load coupled to LED driver 202 and the current selected to be driven through that load.

In some embodiments, in addition to or instead of using digital control circuitry 222, circuit 200 may be interconnected with an external controller (not shown) that may be programmable to coordinate the operation of various blocks within circuit 200. Such a controller may be the same as or distinct from a controller that coordinates operation of a system in which circuit 200 is included. That is, circuit 200 may be coupled to a dedicated external controller, or may share a controller that also performs other functions. Generally speaking, the operation of circuit 200 may be controlled by stored instructions executed by a processor, by hardwired state machines, or by any other suitable control technique.

LED driver circuit 202 may include a plurality of LED driver elements ("LED drivers"). Ordinarily, each LED driver would have an output pin, and that output pin would be connected to one LED such as LED 204 (corresponding, for example, to one of LEDs 135 of FIG. 1). As such, an LED driver within LED driver circuit 202 may have its single output 203 coupled to LED 204 and configured to drive LED 204. In some embodiments, however, LED driver circuit 202 may further include one or more LED drivers that have output monitoring and control node 208 in addition to output 205 coupled to LED 206 and operable to drive LED 206. Output monitoring and control node 208 may be configured to enable input or output—depending upon its mode of operation—as described in more detail below. For example, in certain embodiments, output monitoring and control node 208 may provide an output signal to ADC 210 when operating in active mode. In such embodiments, output monitoring and control node 208 may be implemented as a protected low-voltage node, for example in order to protect ADC 210 from excessive input voltages. It is contemplated that in some embodiments, LED driver circuit 202 may be configurable such that during different modes of operation, it may operate as a programmable current source or as a programmable current sink, for example via output monitoring and control node 208 and/or via outputs 203 or 205, or via other outputs not shown here.

In operation, circuit 200 may be configured to drive LEDs 204 and 206 in response to control signals from an external host microprocessor. Moreover, circuit 200 may be configured to measure temperature (e.g., using temperature sensor 212), ambient light (e.g., using visible light photodiode 216), and/or act as an optical signal receiver of radiation emitted by LEDs 204 and/or 206 controlled by LED driver circuit 202 (e.g., using IR photodiode 214). The LED current level may be programmable to provide different illumination levels for different detection and/or measurement ranges. In some embodiments, two or more LEDs may be driven, depending upon the complexity of proximity, distance measurement, motion detection and/or gesture recognition being performed. In other embodiments, however, any other number of LEDs may be used.

In some embodiments, one or more elements of LED driver circuit 202 may be configured to enable analog and/or digital I/O on the same package pins. This in turn may enable programming access and/or debug and manufacturing test access through the LED driver itself. LED driver circuit 202 may also enable additional system-level functions described herein. For example, a main I/O function—i.e., LED driver output—may be multiplexed with supplemental functions, such as bidirectional current/voltage source, DAC output, ADC input, etc.

In some applications, an LED output may be active during a limited period of time. For example, an LED output might be active during particular modes of operation, or a certain fraction of an interval of time (such as in time-division multiplexed operation). In such applications, a particular LED driver element of LED driver circuit 202 may be used as an LED GPIO for other functionality during periods of LED driver inactivity. In other embodiments, one or more LED driver elements may be repurposed to perform other operations as their primary function, which may vary depending on programming and/or external conditions (e.g., automatic detection of the presence of LEDs, external sensor input, servo control output, etc.).

This supplemental analog I/O mode function allows interfacing external sensors or electrical quantities (e.g., voltage, charge, current, etc.) to ADC 210 in order to perform other measurements (e.g., humidity, PIR, temperature, light, capacitance, etc.). In combination with the flexibility of NVM programming, various types of sensors may be implemented. In some embodiments, an external pin configuration (e.g., type of sensor, attached device ID, or measured electrical quantity) may be detected by a host controller and/or sequence control processing core 228, and the host controller and/or sequence control processing core 228 may execute code stored in NVM specific to the detected external configuration. In other embodiments, an LED driver pin may output programmable current and voltage in two polarities. Furthermore, the LED driver may be configured to operate simultaneously in a combination of functional modes. For example, an LED current may be turned on with the analog input active so the pin voltage may be measured internally by ADC 210.

Figure 3:
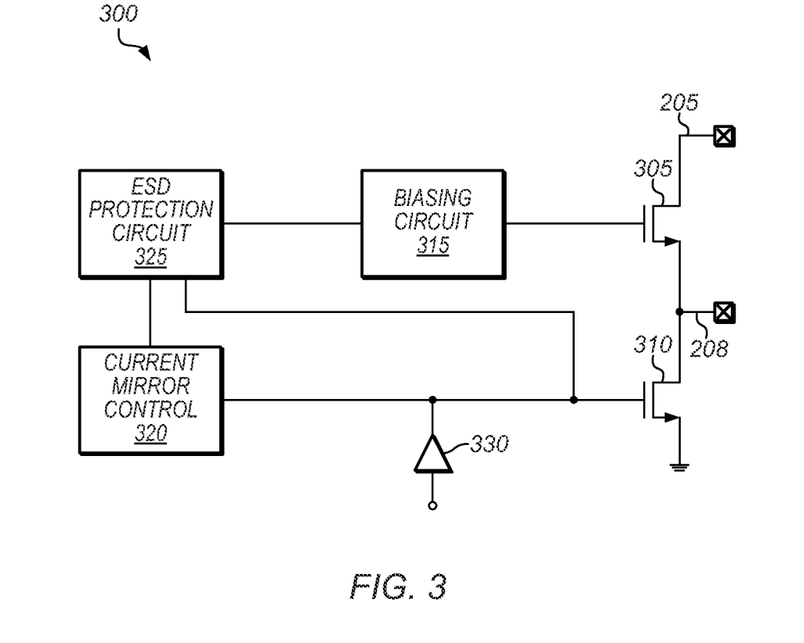
FIG. 3 is a diagram illustrating an LED driver according to certain embodiments.

FIG. 3 is a diagram illustrating an LED driver according to certain embodiments. In some embodiments, LED driver 300 may be configured as described in U.S. patent application Ser. No. 12/650,738, entitled "HIGH-VOLTAGE CONSTANT-CURRENT LED DRIVER FOR OPTICAL PROCESSOR" filed on Dec. 31, 2009, which is hereby incorporated by reference in its entirety. And in some instances, LED driver 300 may be used as an element within LED driver circuit 202 of FIG. 2.

As illustrated in FIG. 3, in addition to output 205 (ordinarily used for driving an LED), LED driver 300 includes output monitoring and control node 208. In some embodiments, output monitoring and control node 208 may be connected to ADC 210 and/or may be operable to pass an analog quantity to or from output 205. Depending on its configuration, output monitoring and control node 208 may serve as an output or as input. In the particular embodiment discussed below, output monitoring and control node 208 is an internal protected low-voltage node.

In some embodiments, LED driver 300 may include an adaptively regulated cascode current source to enable high-voltage operation. The current source may include a stacked pair of transistors including first N-channel transistor 305 and second N-channel transistor 310. Transistor 305 may have its drain connected to output 205 and its source connected to output monitoring and control node 208. Transistor 310 may have its drain connected to output monitoring and control node 208 and its source connected to ground. The gate of transistor 305 may be connected to biasing circuitry 315. The gate of transistor 310 may be connected to current mirror control circuit 320 and ESD protection circuitry 325. The gate of transistor 310 may also be connected to input driver 330, which may provide an input signal to LED driver 300 through node 335.

As seen in FIG. 3, LED driver 300 may include a two-transistor stack including transistor 305 and transistor 310. In operation, transistor 310 may set an accurate current level for LED operation, while transistor 305 may provide voltage protection for transistor 310 and output impedance for LED driver 300. The bias voltage of transistor 305 may be dynamically controlled based upon the mode of operation of LED driver 300.

In some embodiments, LED driver 300 may have at least three modes of operation: active (or "LED on" mode), inactive (or "LED off" mode), and GPIO. In a non-limiting example, when LED driver 300 is in active mode, the LED driver circuitry may be active to drive an LED through output 205, and both transistors 305 and 310 may be turned on. When LED driver 300 is in inactive mode, both transistors 305 and 310 may be turned off. And when LED driver 300 is in GPIO mode, transistor 305 may be turned on whereas transistor 310 may be turned off. In some embodiments, output 205 may be connected to a first pin or terminal and output monitoring and control node 208 may be connected to a second pin or terminal. The first pin may be configured to drive an LED, whereas the second pin may be connected to an ADC, DAC, voltage source, current source, etc. to enable advanced monitoring and control using LED driver 300.

Figure 4:
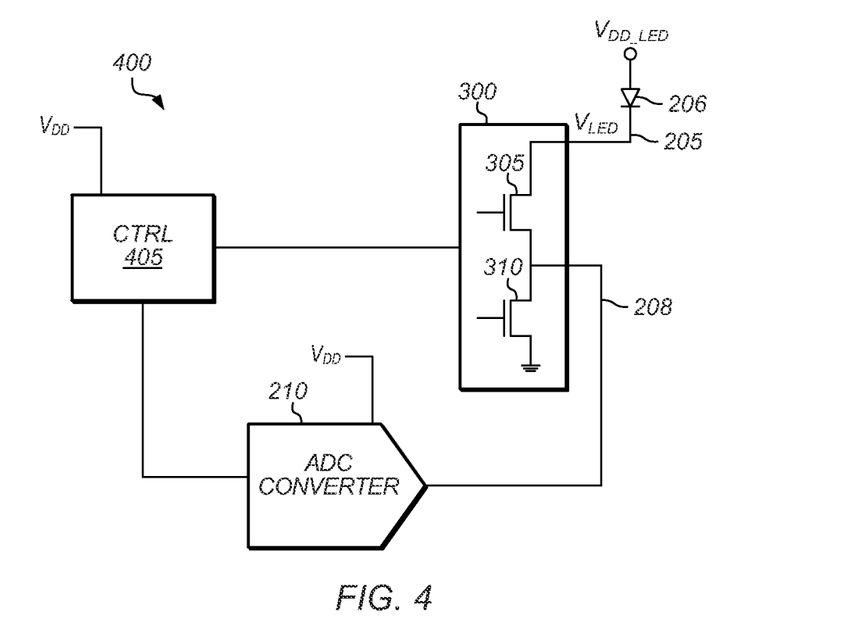
FIG. 4 is a circuit diagram illustrating an LED driver monitoring and control circuit according to certain embodiments.

Referring now to FIG. 4, a circuit diagram illustrating an LED driver monitoring and control circuit is depicted according to certain embodiments. Control block 405 may be coupled to LED driver 300 and may include one or more control blocks within circuit 200 of FIG. 2 such as, for example, sequence control processing core 228, register map 230, etc. LED driver 300 may be such as the one shown in FIG. 3, and it may be coupled to LED 206 via first pin 205. LED driver 300 may also be coupled to ADC block 210 via second pin 208. ADC block 210 may such as the one described with respect to with FIG. 2, and it may be coupled to control block 405.

In the illustrated embodiment, the output device coupled to LED driver 300 (i.e., LED 206) is driven by supply $V_{DD\_LED}$, whereas control block 405 and ADC block 210 are driven by supply $V_{DD}$. As discussed above with respect to FIG. 2, $V_{DD\_LED}$ may be implemented as a supply that is independent of $V_{DD}$ (e.g., $V_{DD\_LED}$ may be supplied directly by a battery, whereas $V_{DD}$ may be generated by a voltage regulator). As previously noted, this type of supply configuration may reduce the latch-up susceptibility of LED driver 300.

In an embodiment, LED driver 300 may operate in active mode by driving LED 206, for example, during a proximity detection operation of circuit 400. Because the voltage drop across transistor 305 is known, the voltage at second pin 208 may be used to determine $V_{LED}$—i.e., the voltage across LED 206—as in a voltage divider. The voltage at second terminal 208 is fed into ADC 210 and passed on to control block 405, which in turn may determine $V_{LED}$. Based on $V_{LED}$, control block 405 may control and/or correct the operation of LED driver 300. For example, control block 405 may control LED driver 300 to maintain a constant output current through LED 206, or to stabilize and control the output current as described in greater detail below. Additionally or alternatively, control block 405 may determine an LED temperature and/or life status parameter. These parameters may be used, for example, to indicate the accuracy of a proximity operation and/or self-test.

In one non-limiting example, circuit 400 may be employed to perform LED status monitoring. For instance, by measuring the voltage drop across LED 206 and/or simultaneously driving LED 206 within a known current, control block 405 may determine an LED life status parameter such as, for example, LED damage, nearing end-of-life, parametric shift, etc. These determinations may be based on a table and/or formula. In an embodiment, control block 405 may set LED driver to inactive mode and then measure at least two values for $V_{LED}$, each value corresponding to a different driving current. In other embodiments, however, at least one of the at least two measurements may alternatively be taken in active mode. Control circuit 405 may then generate an I-V (current versus voltage) curve for LED 206, and thus make LED life status parameter determinations.

In another non-limiting example, circuit 300 may be used to perform LED temperature monitoring. Particularly, LED temperature monitoring may be correlated to $V_{LED}$ when LED 206 is driven at a constant current. This embodiment may apply to diodes of any technology, because in general, Boltzmann $V_T$ temperature is independent or substantially independent as long as the difference in voltage drop across the diode's internal resistance at two measuring currents is significantly less than the $V_T$ value. In an embodiment, control block 405 may take three current measurements, and therefore may obtain both a value of $V_T$ and the internal resistance of LED 206. In alternative embodiments, instead of LED 206, circuit 400 may measure the value of a temperature-dependent resistor having either a negative or positive temperature coefficient.

Figure 5:
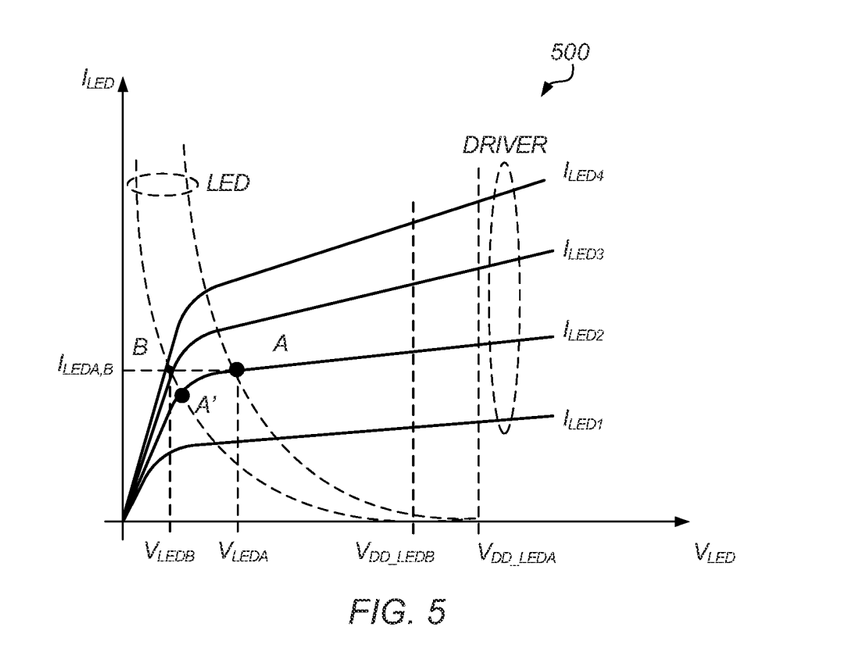
FIG. 5 is graph illustrating I-V curves of an LED driver according to certain embodiments.

In yet another non-limiting example, circuit 400 may perform a procedure for compensating supply voltage variation when in active mode. This procedure may be explained with reference to FIG. 5. Particularly, FIG. 5 shows graph 500 illustrating simulated I-V curves (solid lines) of LED driver 300 at various programmed current levels $I_{LED1}$, $I_{LED2}$, $I_{LED3}$, and $I_{LED4}$ and simulated I-V curves of LED 206 (dotted lines) with different supply voltages. $V_{LEDA}$ and $V_{LEDB}$ are voltages at the LED driver output 205. Assume, for example, that LED driver 300 is set to operate at current level $I_{LED2}$. At this level, the lowest possible $V_{LED}$ value that produces an approximately linear response from LED 206 is $V_{LED4}$ (shown by point A in chart 500). If the voltage provided to LED 206 drops, then, absent some form of correction, the system may find itself inadvertently operating at point A' ("A prime") in chart 500, which may result in substantially lower $I_{LED}$ than $I_{LED1}$ and yield unreliable proximity measurements. Accordingly, in some embodiments, when circuit 400 detects that $V_{LED}$ has dropped to a voltage below $V_{LED4}$, control block 405 may increase the electrical current level of LED driver 300 from $I_{LED2}$ to $I_{LED3}$ (point B in chart 500), thus resulting in a more accurate $I_{LED}$ and more reliable proximity measurement. After $V_{LED}$ has been restored to a value above $V_{LED4}$, then LED driver 300 may return to its original current level $I_{LED2}$ or it may continue operating at its present level.

This supply voltage compensation procedure may allow control block 405 to determine which current level LED driver 300 can reliably operate in based on measurements made with LED driver 300 itself. Control block 405 may therefore adjust the current level up or down dynamically in response to changes in $V_{LED}$ and/or supply voltage.

Figure 6A:
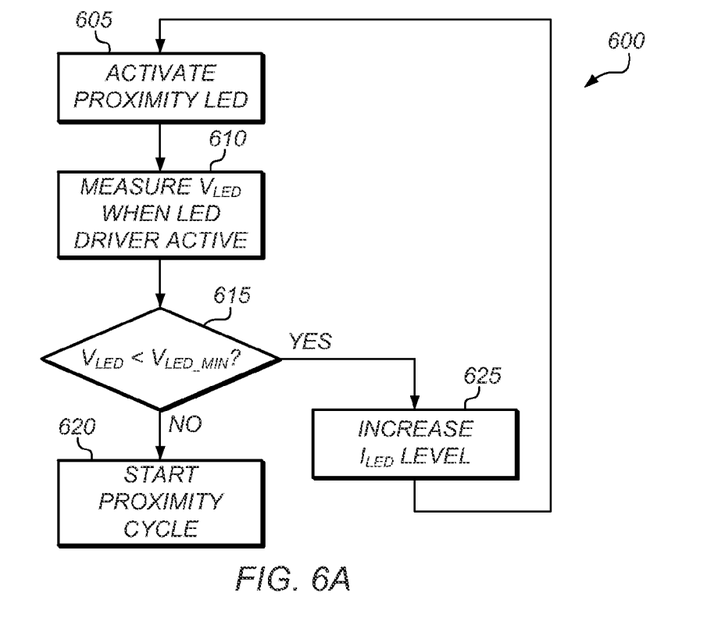
FIGS. 6A and 6B are flowcharts illustrating operations of an LED driver monitoring and control circuit according to certain embodiments.

The operations described above may be further illustrated with respect to FIG. 6. Specifically, FIG. 6A is a flowchart illustrating a method of operation 600 of LED driver monitoring and control circuit 400 according to certain embodiments. At 605, circuit 400 may activate a proximity LED. At 610, control block 405 may measure $V_{LED}$ when LED driver 300 is in active mode. If at 615 control block 405 determines that $V_{LED}$ is greater than a minimum value ($V_{LED\_min}$), then at 620 control block 405 may start a proximity cycle. In some embodiments, if $V_{LED}$ is the same as $V_{LED\_min}$ and if $V_{LED\_min}$ is determined to produce a linear response, then control block 405 may also consider the data obtained to be valid. However, if at 615 control block 405 determines that $V_{LED}$ is smaller than $V_{LED\_min}$, then at 625 control block 405 may increase the current level of LED driver 300 (i.e., $I_{LED}$) to compensate for a possible drop in LED voltage supply, indicate that the original proximity measurement is invalid, and/or retake the proximity measurement by returning to operation 605.

Figure 6B:
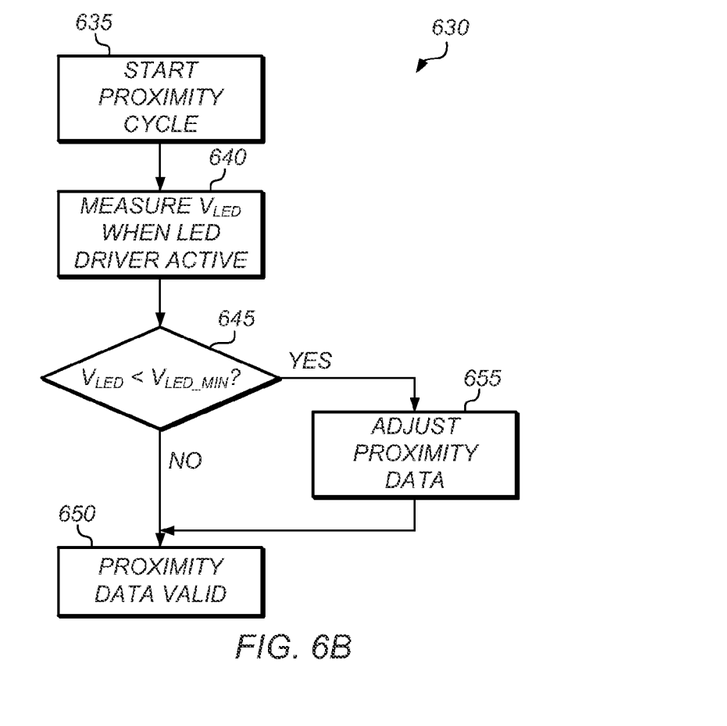

FIG. 6B is another flowchart illustrating an alternative method of operation 630 of monitoring and control circuit 400 according to certain embodiments. In this example, if $V_{LED}$ is determined be greater than $V_{LED\_min}$, then at 650 proximity data is considered valid. On the other hand, if $V_{LED}$ is smaller than $V_{LED\_min}$, then at 655 control circuit 400 may adjust the resulting proximity data according to a pre-defined table or the like. Additionally or alternatively, control circuit 400 may adjust proximity data according to a mathematical formula. In either case, at 650 proximity data is also considered valid.

Figure 7:
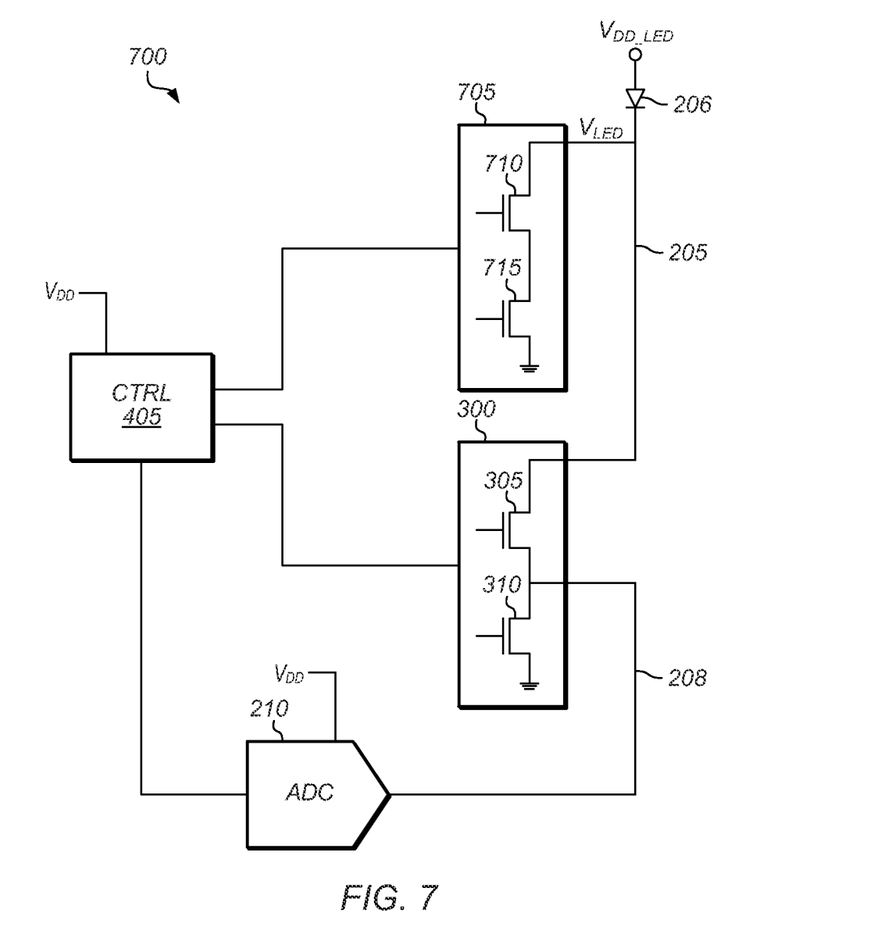
FIG. 7 is a circuit diagram illustrating another LED driver monitoring and control circuit according to certain embodiments.

FIG. 7 is a circuit diagram illustrating another LED driver monitoring and control circuit according to certain embodiments. Circuit 700 may be used as an alternative to circuit 400 of FIG. 4 when LED driver circuit 202 of FIG. 2 includes more LED drivers than are necessary to drive a given number of LEDs. In this instance, LED driver 705 may include a two-transistor stack including transistor 710 and transistor 715, but one output at the drain of transistor 710 is connected to the cathode of LED 206. Moreover, LED driver 300 may be "repurposed" to measure $V_{LED}$ by having output 205 connected to the cathode of LED 206 and second output 208 connected to ADC 210. Although functionally similar to circuit 400 of FIG. 4, circuit 700 may provide, at least in some instances, a more accurate measure of $V_{LED}$ due to the use of a dedicated measurement driver.

Figure 8:
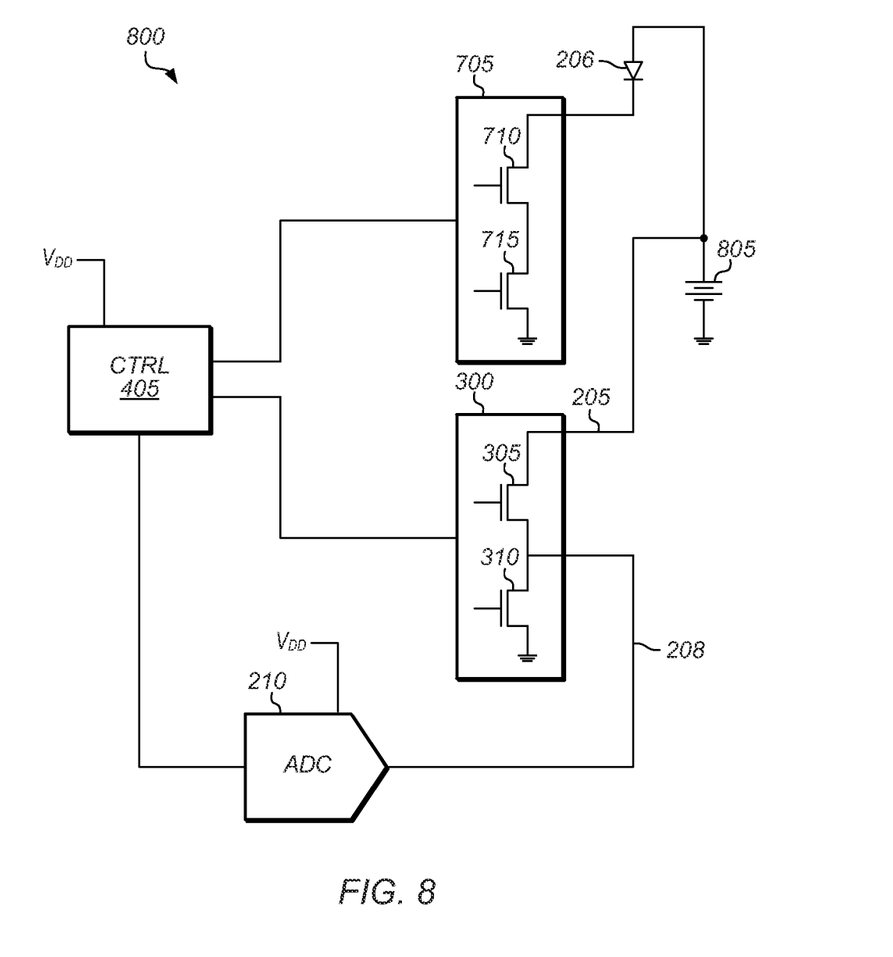
FIG. 8 is a circuit diagram illustrating an LED driver configured to perform a battery discharge monitoring operation according to certain embodiments.

FIG. 8 is a circuit diagram illustrating an LED driver configured to perform a battery discharge monitoring operation according to certain embodiments. Circuit 800 is similar to circuit 700 of FIG. 7, but it has battery 805 powering LED 206, and output 205 of LED driver 300 coupled to battery 805. As such, output monitoring and control node 208 may be configured to measure the voltage of battery 805. In an embodiment, when LED driver 705 is in inactive mode, LED driver 300 may be in GPIO mode and thus measure the voltage available to LED 206 without any load. Subsequently, LED driver 705 may enter its active mode and drive LED 206 with a known current—thus applying a known load level to battery 805—while LED driver 300 measures any voltage drop associated with that known load. If, for instance, the voltage drop is above a threshold value, control circuit 405 may discard a proximity measurement taken during the prior active state.

Typically, battery systems such as battery 805 have a relatively flat discharge curve, which may make it difficult to determine remaining battery charge from the terminal voltage of the battery. Also, battery impedance usually increases with the depth of the discharge level. Furthermore, battery impedance tends to increase with age, typically shortening battery capacity under discharge. In some embodiments, by impulse loading the battery with a discharge rate similar to the peak loading, control circuit 405 can make a more accurate measure of remaining battery capacity or peak loading near end-of-life.

Figure 9A:
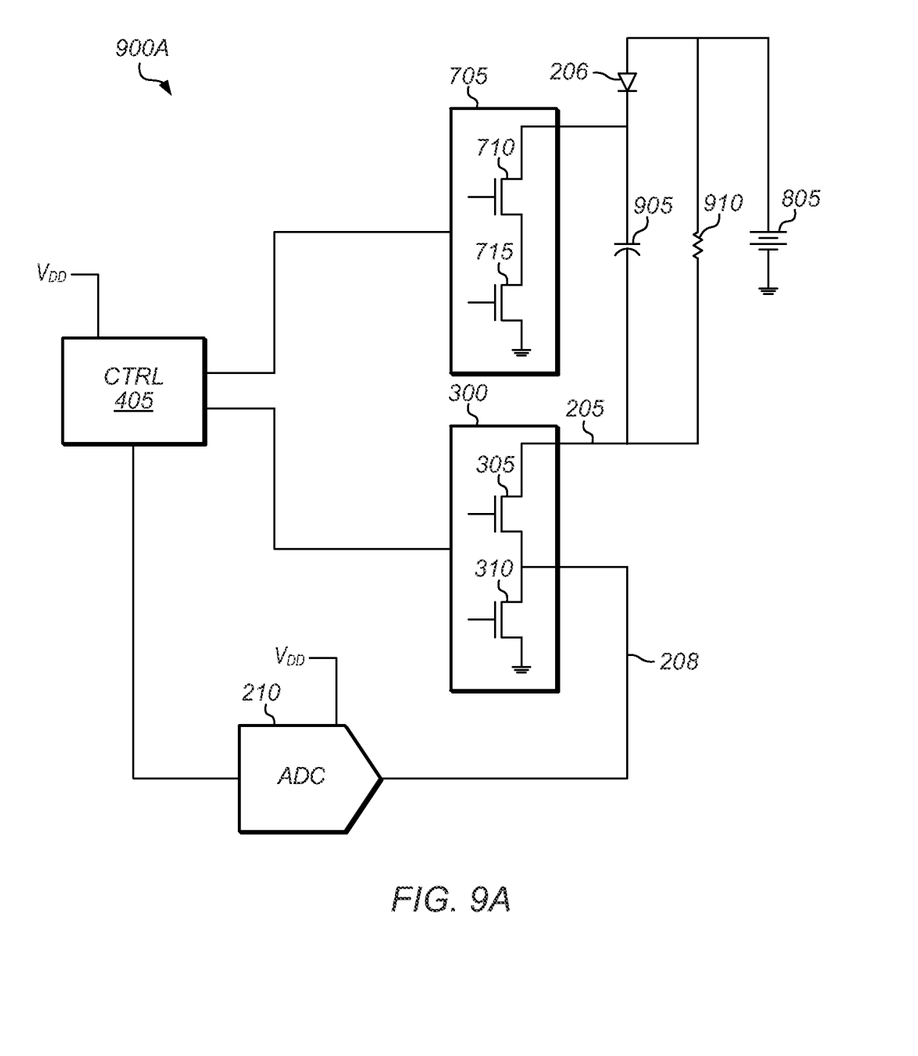
FIGS. 9A and 9B are circuit diagrams illustrating LED drivers configured to act as a charge pump according to certain embodiments.

FIG. 9A is a circuit diagram illustrating an LED driver configured to act as a charge pump according to certain embodiments. Circuit 900 is similar to circuit 800 of FIG. 8, but it has capacitor 905 and resistor 910 in a parallel configuration connected to LED 206 and to output 205 of LED driver 300. In some embodiments, circuit 900 may charge capacitor 905 in a first stage, where LED driver 300 is inactive and LED driver 705 is in GPIO mode. Then, in a second stage, a proximity measurement may be taken. In this second stage, circuit 900 may drive LED 206 with LED driver 300 in active mode and LED driver 705 inactive, thus allowing LED 206 to use the energy stored in capacitor 905 in addition to that provided by battery 805. In this manner, circuit 900 may allow LED 206 to operate with a voltage that is higher than the voltage of battery 805.

Figure 9B:
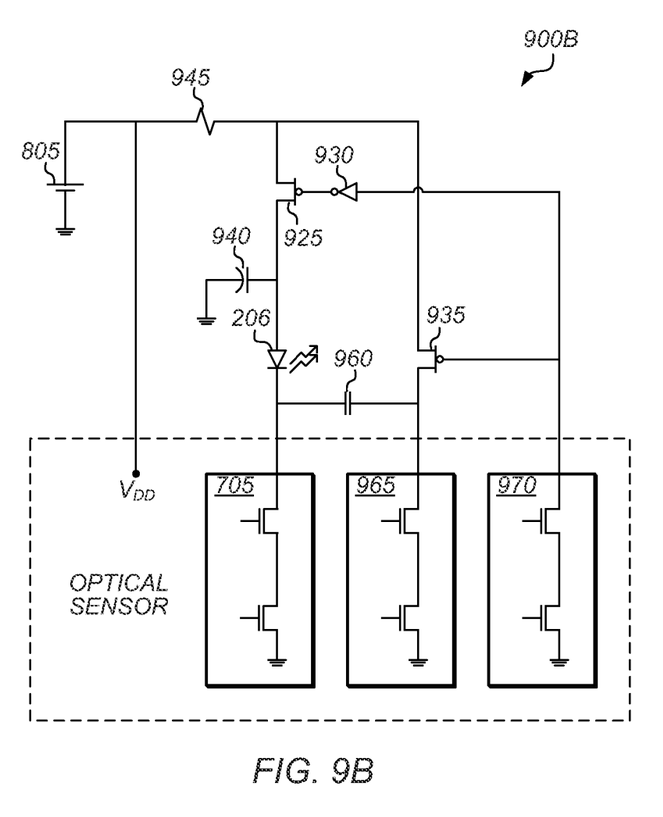

FIG. 9B is another circuit diagram illustrating an LED driver configured to implement a charge pump according to certain embodiments. As illustrated, LED driver 970 operates in GPIO mode and is configured to control switches 925 (through inverter 930) and 935. Resistor 945 and capacitor 940 are optional components that enable decoupling from $V_{BAT}$ provided by battery 805. In a first stage, LED driver 970 turns switch 925 off and switch 935 on. Also, LED driver 965 is disabled and LED driver 705 is enabled, thus causing the voltage across capacitor 960 to increase to approximately the difference between the voltage of battery 805 ($V_{BAT}$) and the voltage drop across LED 206 ($V_{LED}$). Then, in a second stage, LED driver 970 turns switch 925 on and switch 935 off. At this point, LED driver 965 is enabled and drives LED 206 in proximity mode. Therefore, similarly as described above with respect to FIG. 9A, circuit 900B allows LED 206 to operate with a voltage that is higher than the voltage of battery 805.

Figure 10:
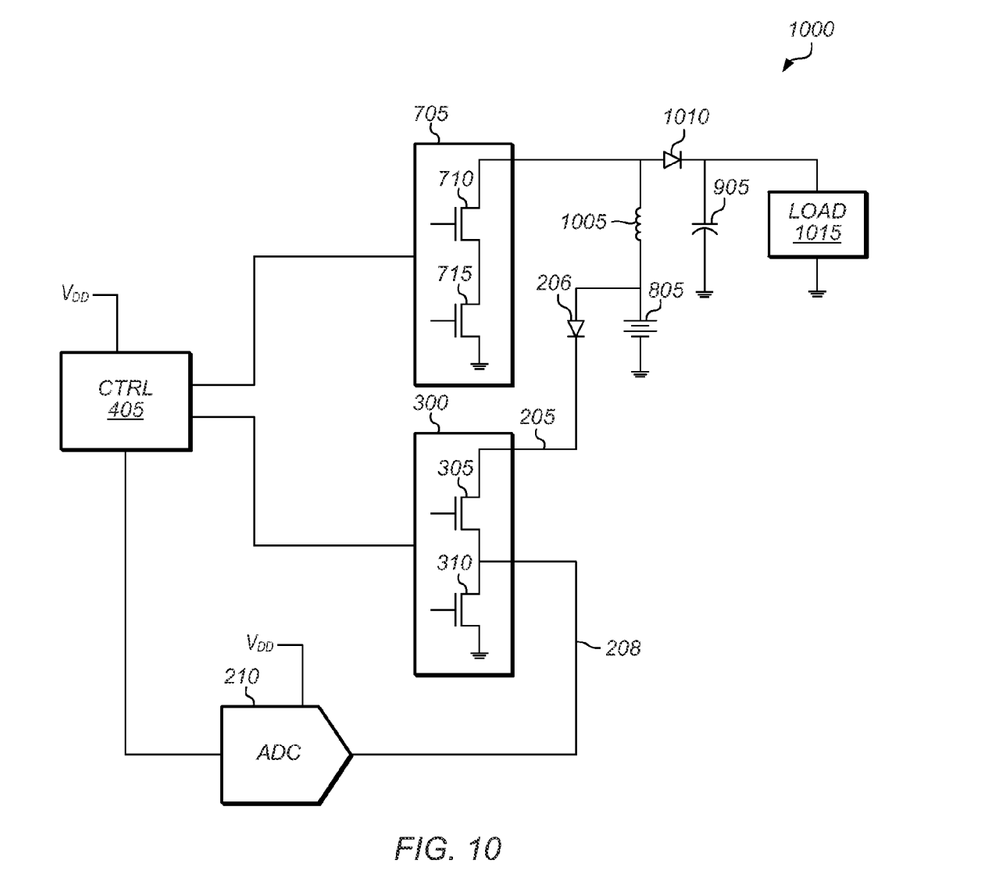
FIG. 10 is a circuit diagram illustrating an LED driver configured to act as a boost converter according to certain embodiments.

FIG. 10 is a circuit diagram illustrating an LED driver configured to act as a boost converter (which may also be referred to as a DC-DC converter) according to certain embodiments. Circuit 1000 has the output of LED driver 705 coupled to inductor 1005 and to the anode of diode 1010.

Inductor 1005 is coupled to battery 805 and to LED 206. The configuration of LED driver 300 is otherwise similar to that described with respect to FIG. 9 above. The cathode of diode 1010 is coupled to capacitor 905 and load 1015. As such, LED driver 705 may be "repurposed" to drive load 1015.

Still referring to FIG. 10, a DC-DC up converter may be implemented by circuit 1000 with LED driver 705 driven at a given frequency and duty cycle, and coupled to the external components shown above to form a booster converter. In some embodiments, another LED driver (not shown) may be used to monitor the output voltage of the DC-DC converter. For example, a DC-DC converter can be configured as an LED driver with a constant current load, a speaker driver, etc.

As previously discussed, several functions may be implemented as software code in non-volatile memory. Non-volatile memory may be configured to store instructions and data accessible by a host processor (e.g., MCU 105 of FIG. 1) and/or a control circuit (e.g., sequence control processing core 228 of FIG. 2).

In some embodiments, systems and methods for advanced monitoring and control using an LED driver may enable multiplexing of functions on a single (or reduced number of) pin(s). These systems and methods may find application, for example, in an optical processor. Generally speaking, as circuits become smaller, the number of pins available for dedicated I/O is reduced. Particularly in the case of optical processors, these devices are often enclosed in a clear and tiny package so that they may be placed on the edge of a printed circuit board to be able to "peer out" an optical window of the end product (e.g., a mobile phone). Due to these and other small packaging restrictions—e.g., small packaging may also be less reliable due to differences in thermal coefficients, etc.—a low pin count device may be used.

The structures and techniques described above need not be limited in any way to optical sensors. Rather, other systems and sensors may be built based on principles described herein. Examples of other such systems include, but are not limited to: passive infrared (PIR) sensor; smoke or gas alarm sensor; color sensor; oximeter; glucose sensor; heart-rate sensor; medical diagnostics sensor; turbidity sensor; optical light switch; rain, ice or snow sensor; position encoder; photo interrupter; gesture sensor; capacitive, resistive touch or position sensor; daylight sensor; optical communication transceiver; remote control receiver/transmitter; optical isolator; synchronous array or sensors; etc.

Although the embodiments above have been described in considerable detail, numerous variations and modifications will become apparent to those skilled in the art once the specification is fully appreciated. It is intended that the following claims be interpreted to embrace all such variations and modifications.

What is claimed is:

1. A monitoring and control circuit comprising:
a light-emitting diode (LED) driver including a control input, an output, and a node, wherein the output is coupled to an LED;
a multiplexer coupled to the node of the LED driver;
an analog-to-digital converter coupled to the multiplexer; and
a controller coupled to the analog-to-digital converter and to the control input of the LED driver;
wherein the LED driver is coupled to drive the output to illuminate the LED with a first voltage supply, wherein a second voltage supply is coupled to drive the controller, and wherein the second voltage supply is a controlled voltage derivation of the first voltage supply;
wherein the LED driver comprises a voltage protection transistor in series with a current setting transistor, wherein the output of the LED driver is coupled to a drain of the voltage protection transistor, wherein the node of the LED driver is coupled to a drain of the current setting transistor.

2. The circuit of claim 1, wherein the LED driver is operable to drive a programmable constant current through the LED, and wherein the node is not accessible for input or output by a device external to the monitoring and control circuit.

3. The circuit of claim 2, wherein the controller is operable to determine a voltage at the output of the LED driver based, at least in part, on a voltage measured at the node of the LED driver.

4. The circuit of claim 3, wherein the controller is operable to take an optical proximity measurement at a constant current driven through the LED, and wherein the controller is operable to determine whether the proximity measurement is valid based, at least in part, on the determined voltage.

5. The circuit of claim 4, wherein in response to determining that the proximity measurement is not valid, the controller is operable to adjust the proximity measurement dependent upon the determined voltage.

6. The circuit of claim 3, wherein the controller is operable to adjust an electrical current level of the LED driver based, at least in part, on the determined voltage.

7. The circuit of claim 3, wherein the controller is operable to determine a parameter associated with the LED based, at least in part, on the determined voltage, wherein the parameter includes one or more of an LED temperature or a LED life status parameter.

8. The circuit of claim 1, wherein the first voltage supply is received from a battery, and wherein the second voltage supply is a voltage-regulated version of the first voltage supply.

9. An optical sensor system comprising:
a host processor; and
an optical sensor coupled to the host processor, the optical sensor including:
a first driver circuit including an input and an output, wherein the output is coupled to at least one electro-optical transducer;
a second driver circuit including an input, an output, a node, a voltage protection element coupled to the node, and a current setting element coupled to the node;
a multiplexer circuit coupled to the node of the second driver circuit;
an analog-to-digital converter circuit coupled to the multiplexer circuit; and
a controller circuit coupled to the analog-to-digital converter circuit, to the input of the first driver circuit, and to the input of the second driver circuit;
wherein the voltage protection element is a voltage protection transistor in series with the current setting element, wherein the current setting element is a current setting transistor, and wherein the output of the second driver circuit is coupled to a drain of the voltage protection transistor and the node of the second driver circuit is coupled to a drain of the current setting transistor.

10. The system of claim 9, wherein the output of the first driver circuit and the output of the second driver circuit are coupled to a cathode of the at least one electro-optical transducer.

11. The system of claim 10, wherein the controller circuit is operable to determine a voltage at the output of the second driver circuit based, at least in part, on a voltage measured at the node of the second driver circuit; and to adjust an electrical current level of the first driver circuit in response to the determined voltage.

12. The system of claim 10, wherein the controller circuit is operable to determine a voltage at the output of the second driver circuit based, at least in part, on a voltage measured at the node of the second driver circuit; and to determine a parameter associated with the at least one electro-optical transducer in response to the determined voltage.

13. The system of claim 9, wherein the output of the first driver circuit is coupled to a cathode of the at least one electro-optical transducer and the output of the second driver circuit is coupled to an anode of the at least one electro-optical transducer; wherein the system further comprises a battery coupled to the anode of the at least one electro-optical transducer; and wherein the controller circuit is operable to determine a discharge level of the battery.

14. The system of claim 13, further comprising a voltage increasing circuit coupled to the output of the second driver circuit, wherein the voltage increasing circuit comprises either a boost converter or a charge pump, and wherein the voltage increasing circuit is operable to produce a voltage higher than a system supply voltage.

15. A method comprising:
measuring a voltage at a node of a light-emitting diode (LED) driver of an optical sensor, wherein the LED driver is connected to an LED via an output pin;
driving the LED using a first controlled voltage supply and driving a control circuit coupled to the LED driver using a second controlled voltage supply, wherein the first and second controlled voltage supplies are independent voltage supplies;
determining a voltage at the output pin based, at least in part, on the measured voltage; and
modifying an electrical current level of the LED driver based, at least in part, on the determined voltage.

16. The method of claim 15, wherein measuring comprises measuring with the optical sensor.

17. The method of claim 15, wherein modifying the electrical current level comprises increasing the electrical current level in response to the determined voltage indicating a non-linear response.

18. The method of claim 17, wherein the device parameter is a battery discharge associated with a battery operable to power the LED.

19. A method comprising:
measuring a voltage at a node of a light-emitting diode (LED) driver of an optical sensor, wherein the LED driver is connected to an LED via an output pin, wherein the node is coupled to a drain of a current setting transistor and a source of a voltage protection transistor;
determining a voltage at the output pin based, at least in part, on the measured voltage; and
calculating a device parameter based, at least in part, on the determined voltage.

20. The method of claim 19, wherein the device parameter includes one or more of an LED temperature or an LED life status parameter.

* * * * *